United States Patent [19]
Bricheno et al.

[11] Patent Number: 5,513,033
[45] Date of Patent: Apr. 30, 1996

[54] OPTICAL FIBRE AMPLIFIER

[75] Inventors: Terry Bricheno, Moorland View; Alan Fielding, Bishop's Stortford; Sandra Davis, Fir Cottage, all of United Kingdom

[73] Assignee: Northern Telecom Limited, Montreal, Canada

[21] Appl. No.: 65,220

[22] Filed: May 20, 1993

[30] Foreign Application Priority Data

Jun. 27, 1992 [GB] United Kingdom ............ 9213713

[51] Int. Cl.$^6$ ............................................. G02B 6/26
[52] U.S. Cl. ............................................ 359/341; 385/27
[58] Field of Search ............................ 359/341; 372/6; 385/43, 45, 27, 50

[56] References Cited

U.S. PATENT DOCUMENTS

| | | | |
|---|---|---|---|
| 4,941,726 | 7/1990 | Russell | 350/96.15 |
| 4,963,832 | 10/1990 | Desurvire et al. | 330/4.3 |
| 5,077,817 | 12/1991 | Shang | 385/46 |
| 5,171,345 | 12/1992 | Takemura | 385/96 |
| 5,175,778 | 12/1992 | Nourshargh et al. | 385/42 |

FOREIGN PATENT DOCUMENTS

| | | |
|---|---|---|
| 0143561 | 6/1985 | European Pat. Off. |
| 0148569 | 7/1985 | European Pat. Off. |
| 2230912 | 10/1990 | United Kingdom |
| WO87/00934 | 2/1987 | WIPO |
| WO90/08968 | 8/1990 | WIPO |

OTHER PUBLICATIONS

Takeuchi et al., "Coupler Type Multi/Demultiplexer Composed of Different Parameter Fibres", Electronics Letters, vol. 27, No. 7, 28 Mar. 1991, pp. 575–576.

Minelly et al, "Wavelength Combining Fused–Taper Couplers With Low Sensitivity To Polarisation For Use . . . etc.," Electronic Letters, vol. 26, No. 8, 14 Apr. 1990, pp. 523–524.

Gonthier et al, "2×2 Multiplexing Couplers For All–Fibre 1.55 μm Amplifiers and Lasers", Electronics Letters, vol. 27, No. 1, 3 Jan. 1991, pp. 42–43.

Wilkinson et al., "Close–Spaced Fused Fibre Wavelength Division Multiplexers With Very Low Polorisation Sensitivity," Electronics Letters, vol. 26, No. 6, 15 Mar. 1990, pp. 382–384.

Wada, et al., "High Efficiency Erbium–Doped Fiber Amplifier Using Mode Field Diameter Adjusting Technique", Jul. 1991 second topical meeting on optical amplifiers held in Snowmass Village, CO, pp. 258/FD 3–1 to 261/FD 3–4.

*Primary Examiner*—Mark Hellner
*Attorney, Agent, or Firm*—Lee, Mann, Smith, McWilliams, Sweeney & Ohlson

[57] ABSTRACT

An optical fibre amplifier in which a length of optically amplifying fibre is spliced between a pair of 2×2 tapered fused fibre couplers each constructed from a length of amplifier type profile fibre and a length of transmission type profile fibre. In each coupler, one of two constituent fibres has been pre-stretched so as to match the propagation constants of the two fibres within the coupling region of that coupler.

6 Claims, 3 Drawing Sheets

OPTICAL FIBRE AMPLIFIER

BACKGROUND OF THE INVENTION

This invention relates to optical fibre amplifiers, such as erbium doped fibre amplifiers. In such an amplifier pump power at a wavelength $\lambda_p$ is launched into the amplifier fibre in order to produce the requisite population inversion necessary to promote amplification of the signal power at a wavelength $\lambda_s$ also caused to propagate along the amplifier fibre. The pump power is combined with the signal power by some form of wavelength multiplexer, which may for instance take the form of a dichroic mirror or a 2×2 tapered fused fibre coupler. An example of such use of 2×2 couplers is for instance to be found in the amplifier described in GB-A 2 230 912 with particular reference to its FIG. 5. That particular amplifier employs bidrectional pumping, and so a wavelength multiplexing 2×2 coupler is employed upstream of the amplifying fibre for the co-pumping, and a further wavelength multiplexing 2×2 coupler is employed downstream of it for the counter-pumping.

The fibre from which the two wavelength multiplexing 2×2 couplers is made is typically conventional single mode transmission type (non-amplifying) fibre, whereas the amplifier is different because it is required to incorporate the material that renders it optically amplifying. If the two types of fibre happen to have substantially the same refractive index profile, a relatively low loss optical coupling between each end of the amplifier and an associated one of the ports of the two 2×2 couplers can in principle be made by simple fusion butt splices. However, high efficiency optically amplifying fibre typically has a refractive index profile significantly different from that of conventional single mode optical communications fibre. As a result of this difference, the two types of fibre have significantly different spot sizes, and this means that a simple fusion splice of the one type of fibre to the other gives rise to a splice loss that is inconveniently high for some applications. In some circumstances the amount of this loss can be somewhat reduced by heating the splice so as to promote localised diffusion of the core region of the optically amplifying fibre into its cladding so as to produce a localised reduction in its spot size. This is for instance described by A. Wada et al in a paper entitled 'High Efficiency Erbium-Doped Fiber Amplifier using Mode Field Diameter Adjusting Technique' given at the second topical meeting on optical amplifiers held in July 1991 at Snowmass Colo. (pp 258/FD3-1 to FD3-4/261). This paper explains that diffusion produced by localised heating in the region of the splice has no effect in reducing the effects of spot size mismatch if the diffusion constants of the two fibres are substantially matched, and that in consequence the technique can be effective only if the smaller spot sixe amplifier has a significantly larger diffusion constant than the transmission type fibre to which it is being spliced.

SUMMARY OF THE INVENTION

The present invention is directed to an alternative solution to the problem, a solution in which the loss can be reduced to values comparable with the insertion loss of certain forms of 2×2 tapered fused fibre couplers, and which does not impose the same diffusion constant conditions as referred to in the above-referenced paper by A. Wada et al.

According to the present invention there is provided an optical fibre amplifier including a first length of single mode optical fibre laterally optically coupled in a first coupling region with a second length of single mode optical fibre, and in a second coupling region with a third length of single mode optical fibre, wherein said second and third lengths of optical fibre have substantially matching index profiles that are mismatched with respect to that of said first length of optical fibre, thereby providing said first length of optical fibre with a spot size mismatched with respect to that of said second and third lengths of optical fibre, and wherein included in said first length of optical fibre, between said first and said second coupling regions, is a length of optical fibre that is capable of being rendered optically amplifying to light of a first frequency when optically pumped with light of a second frequency, and wherein each of said first and second coupling regions is provided by a 2×2 tapered fused fibre coupler in which one of the two constituent fibres of that coupler is tapered more than the other by an amount providing the two constituent fibres with substantially matching propagation constants within its coupling region.

BRIEF DESCRIPTION OF THE DRAWINGS

There follows a description of optical fibre amplifiers embodying the invention in preferred forms. The description refers to the accompanying drawings, in which.

DETAILED DESCRIPTION OF PREFERRED EMBODIMENTS

Figure 1:
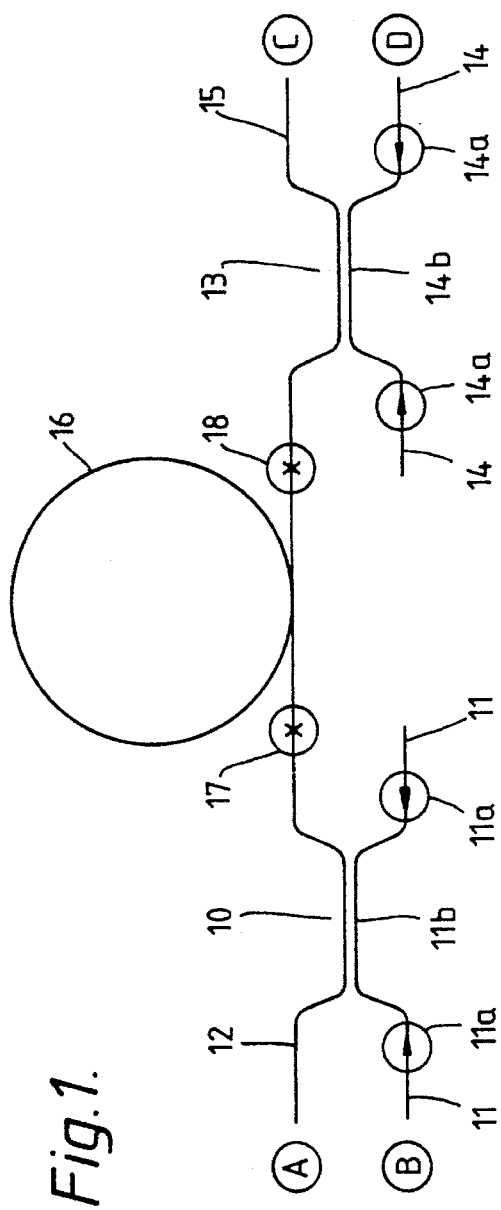
FIGS. 1 and 2 are schematic representations of two optical amplifiers embodying the invention in preferred forms.

Whereas an example of single-mode transmission type fibre may typically have an index difference of $3.3 \times 10^{-3}$, a core radius of 4 μm, a spot size radius of about 10 μm, and an overall diameter of 125 μm; the comparable figures for a typical length of high efficiency erbium doped single-mode amplifying fibre are an index difference of $35 \times 10^{-3}$, a core radius of 1.5 μm, a spot size radius of about 1.9 μm, and an overall diameter of about 85 μm (or 125 μm if pulled from a sleeved preform).

A length of the above-identified transmission type fibre, hereinafter referred to as transmission profile type fibre, can be fusion spliced by butt welding in the normal way to a length of the above-mentioned amplifying fibre, or non-amplifying fibre having the same index profile as the above-mentioned amplifying fibre, hereinafter referred to as amplifying profile type fibre, with the same overall diameter. However the mismatch in index profiles of the transmission profile and amplifying profile types of fibre is liable to provide the splice with a loss of about 3 dB. In some circumstances this value can be reduced to about 0.5 dB by heating the vicinity of the splice to promote diffusion of the core material of the fibres, but this value of loss is still quite high compared with what can be achieved when butt-splicing identical fibres.

A length of the transmission profile type fibre can similarly be stranded with a length of the amplifying profile type fibre, and the stranded fibres can be laterally coupled by subjecting them to a progressive stretching method of making a 2×2 tapered fused fibre coupler substantially as described in GB-B 2 150 703. However, whereas when making such a fused fibre coupler from a pair of identical fibres it is possible to arrange the coupling strength so that substantially all of the optical power launched into one of the fibres at a particular wavelength will be coupled to the other, with a transmission profile type fibre stranded with an amplifier profile type fibre, the maximum power transfer is typically only about 50% as a result of the mismatch of propagation constant of the fibres in the coupling region. This figure can be improved upon by altering the propagation constant of one of the fibres by pre-stretching (pre-tapering) it prior to stranding it with the other fibre. This pre-stretching of one of the fibres is conveniently achieved by the same progressive stretching method as is used to make the 2×2 tapered fused fibre coupler. One fibre is mounted in the apparatus and stretched the requisite amount before being removed from the apparatus, stranded with the other fibre, and replaced in the apparatus ready for the making of the coupler. The required amount of stretching is conveniently determined empirically.

With the progressive stretching method of GB-B 2 150 703 for making a fused fibre 2×2 coupler one can monitor the power transfer all the time the coupler is being made. In this way one can determine the peak power transfer coefficient as, as the result of the progressive stretching, the coupling strength progressively increases and the power launched into one of the fibres is progressively coupled back and forth between the two fibres. If one makes a first coupler from the two unmatched fibres without pre-stretching either of them, and if one then makes another coupler where one of the fibres has been subjected to a small amount of pre-stretching, a comparison of the peak power transfer coefficients of the two couplers will show whether the pre-stretching has reduced the mismatching, as evidenced by an enhanced peak power transfer coefficient, or whether the wrong fibre has been pre-stretched. This process can then be repeated making couplers with different amounts of pre-stretching of the appropriate one of the fibres until an empirical match, as evidenced by a substantially 100% peak power transfer coefficient is obtained.

In the case of forming a 2×2 fused coupler between a length of the 125 μm overall diameter the transmission profile type fibre and a length of the 85 μm overall diameter amplifying profile fibre, it was found empirically that the transmission profile type fibre needed to be stretched until its diameter was reduced to about 80 μm in order to produce the matching condition in which power at a particular wavelength is transferable substantially completely from one fibre to the other. Two such couplers are depicted schematically at 10 and 13 in the optical amplifier of FIG. 1, each of them being constructed from a length 11, 14 of transmission profile type fibre and a length 12, 15 of amplifier profile type fibre. Before the two couplers 10, 13 are made, each of the transmission type fibres 11, 14 is individually pre-stretched, using the progressive stretching method of GB-B 2 150 703, in a manner producing a pair of tapers 11a, 14a between which there is an intervening length of pre-stretched fibre 11b, 14b. Between the nearer ends of the two fibres 12 and 15 is inserted by butt splices 17, 18 an intervening length 16 of amplifying profile type fibre which is optically amplifying fibre as the result of its erbium doping. Generally the amplifying profile type fibres 12 and 15 are lengths of fibre with the same index profile as that of the fibre 16, but without the erbium doping, and so are not themselves optically amplifying, but if either of them is constructed from optically amplifying fibre, then the fibre 16 can be extended to include the amplifying profile type fibre of that coupler, and so dispense with the need for its associated splice 17 or 18. The signal input to the amplifier is applied to input port B of coupler 10, while the signal output is delivered from output port D of the coupler 13. For co-pumping, the optical pump power is applied to input port A of the coupler 10 while, for counter-pumping, optical pump power is applied to port C of coupler 13. If desired, the amplifier can receive co- and counter-pumping simultaneously.

The couplers 10 and 13 are multiplexing couplers whose precise construction will depend upon the relationship between the signal frequency applied to port B and the pump frequency applied to port A and/or port C.

If the frequencies are widely separated, such as for instance using a light at a wavelength of 980 nm to pump a signal at a wavelength of 1550 nm, the construction is relatively simple because the coupling strength of the coupler only needs to be strong enough for a single transfer of power at the signal frequency from one fibre to the other. At this strength of coupling, power at the higher frequency of the pump is still so tightly coupled that it passes straight through the coupler, on the one fibre, without any significant transfer of power to the other fibre. Also, at this strength of coupling the form birefringence is small enough to make the coupling of signal power across from one fibre to the other substantially independent of the state of polarisation of that signal power.

If the pump and signal frequencies are much closer, for instance using light at a wavelength of 1480 nm to pump a signal at a wavelength of 1550 nm, then the construction of each coupler 10, 13 needs to be rather more complicated because, if the coupling is strong enough to couple the signal frequency from the transmission profile type fibre 11 to the amplifier profile type fibre, it will also be strong enough to effect coupling between the two fibres at the only slightly higher pump frequency. Therefore the strength of coupling has to be arranged so that it couples the signal frequency between the two fibres an odd number of times, while at the same time coupling the pump frequency between them an even number of times. The greater strength of coupling that is employed to achieve this condition, means that the effects of form birefringence can no longer be neglected if the amplifier is to operate independent of the state of polarisation of its signal input.

Significant birefringence in a progressively stretched fused fibre coupler normally arises because the stretching is normally performed at a high enough temperature to provide a substantial coalescence of the two fibres so as to convert the highly re-entrant initial figure eight configuration of cross-section to one in which the re-entrance is minimal or non-existent. If the amount of coupling between the two fibres is relatively weak, as for instance in the case of a coupler providing only a single transfer of power between the fibres, then the amount of form birefringence of a coupler made at a temperature producing substantial coalescence of the fibres is small enough to be neglected, but with stronger coupling involving multiple power transfers, the form birefringence assumes greater significance. The result is that, if form birefringence is not compensated, the coupler can be constructed so to transfer power efficiently for either one of the principal states of polarisation of that coupler, but not both states together. Our method of reducing the effect of form birefringence, and hence of obviating this problem, is described by I. J. Wilkinson and C. J. Rowe in an article entitled "Close Spaced Fused Fibre Wavelength Division Multiplexer with very low Polarisation Sensitivity", Journal Elec. Letters March 1990, Vol 26, No. 6 p382, and involves twisting of the fibres. Another method involves performing the progressive stretching operation at a significantly lower temperature, one in which the fibres become united over only a small proportion of their circumference, and thus retain a cross-sectional configuration more closely approximately to a figure eight. It is believed that this is effective in reducing the effect of form birefringence by matching it with an oppositely directed stress birefringence.

At least in the case of reducing the effects of form birefringence through reducing the temperature at which the coupler is made, the reduction of the effect of form birefringence is brought about at the expense of introducing another factor, namely that the propagation constants of the two fibres in the coupling region are also effected. In the case of a coupler, like couplers 10 and 13 of FIG. 1, that is constructed from dissimilar fibres this change in propagation constant may not be the same for both fibres, in which the case the match of propagation constant is not preserved over the full range of possible temperatures for constructing the coupler. In other words, a double match has to be obtained in that it is necessary not only to make the coupler at the temperature which cancels out the form birefringence, but also to pre-stretch one of the fibres so that its propagation constant is matched with the other when the coupler is made at that temperature.

Figure 2:
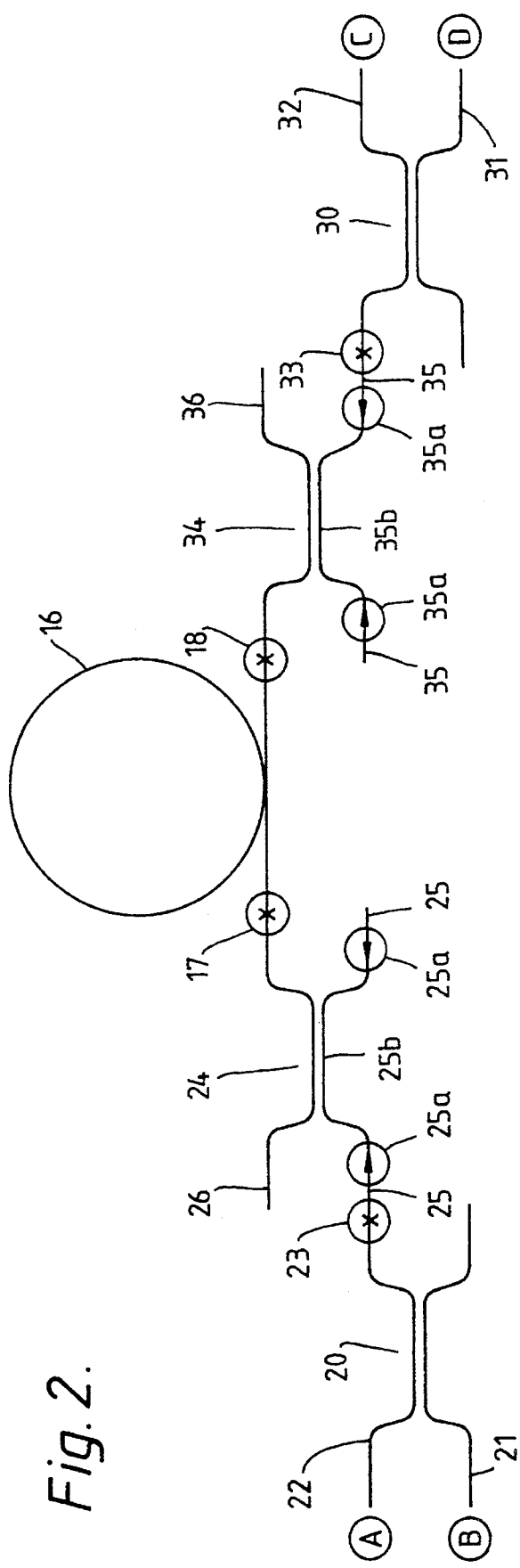

These problems of the double match can be alleviated somewhat by replacing each single coupler 10, 13 of FIG. 1 with two couplers 20, 24 and 30, 34 respectively, as depicted in FIG. 2. Couplers 20 and 30 are both polarisation insensitive wavelength multiplexing 2×2 fused fibre couplers respectively made from two lengths 21, 22 and 31, 32 of identical transmission profile type fibre. The strength of coupling exhibited by each of these couplers is such that the light at the signal wavelength launched into one of its input ports, and light at the pump wavelength launched into the other port, emerge from the coupler on a common port that is connected to an input port of the respective one of the other pair of couplers 24 and 34. The wavelength multiplexing fused fibre couplers 20 and 30 need to be constructed in a way to cancel out their birefringence to make them polarisation insensitive. The same techniques can be used for this purpose as have been identified above in connection with making the couplers 10 and 13 of FIG. 1 polarisation insensitive. The task is more easily achieved in the case of couplers 20 and 30 because these couplers are constructed from identical pairs of fibres. Accordingly, since the constants are always matched, whatever the profile, no special steps need to be taken to ensure that the propagation constants are matched at the profile providing polarisation insensitivity.

The two wavelength multiplexing fused fibre couplers 30 and 30 are respectively connected by splices 23 to the other two 2×2 fused fibre couplers 24 and 34, which are each constructed from a length 25 of transmission profile type fibre and a length 26 of amplifier profile type fibre, and which are splice couplers, that is optical couplers constructed to have the property that optical power at the signal and pump wavelengths launched into one fibre of the coupler is coupled substantially completely across to emerge from the other fibre. Since the two fibres of each splice coupler 24, 34 have dissimilar profiles and therefore unmatched propagation constants, one of its constituent fibres requires to be pre-stretched in order to bring about the requisite substantial match of propagation constants necessary to achieve substantially total power transfer from one fibre to the other. Accordingly, before the two couplers 24, 34 are made, both of the transmission type fibres 25 are individually pre-stretched using the progressive stretching method of GB-B 2 150 703 in a manner producing pairs of tapers 25a between which there are intervening lengths 25b of pre-stretched fibre.

It may be observed that, as with the construction of the 2×2 fused fibre couplers 10 and 13 of FIG. 1, so with the construction of the 2×2 fused fibre splice couplers 24 and 34 of FIG. 2, there is still the requirement simultaneously to achieve both substantial match of propagation constant and substantial polarisation insensitivity. However, in the case of the splice couplers these requirements are significantly easier to achieve because the coupling strength is much weaker, requiring only a single transfer of power from one fibre to the other, whereas the couplers 10 and 13 of FIG. 1 have a much stronger coupling that involves multiple power transfers. On account of the relatively weak coupling of the splice couplers, the form birefringence is much smaller, and may be so small that no compensation needs to be made, and if compensation is required, it is at a low level introducing stresses that are well beneath the threshold at which stress fracture problems are liable to be encountered.

Between the two splice couplers 24 and 34 is connected, by the fibre butt splices 17 and 18, the intervening length 16 of amplifying profile type fibre which is rendered optically amplifying to light of the signal wavelength when pumped with light of the pump wavelength. As in the case of the amplifier of FIG. 1, so with this amplifier of FIG. 2, signal power to be amplified is applied to the amplifier by way of port B to emerge amplified by way of port D as a result of pump power applied to either or both of ports A and C. If pump power is applied from only one end of the amplifier then it will be possible to dispense with the wavelength multiplexing coupler at the other end, provided that excess pump power remaining upon the signal line beyond the amplifier does not disturb operation of the optical transmission system in which the amplifier is situated.

In the foregoing specific description each of the two 2×2 fused fibre couplers 10 and 20 have between described as devices in which substantially all the optical signal and pump power applied to its input ports emerges substantially exclusively from only one of its output ports. Such amplifiers may however be modified so that a small proportion of the power shall emerge from the other output port and be available for use in monitoring the operation of the transmission system into which the amplifier has been incorporated.

Figure 3:
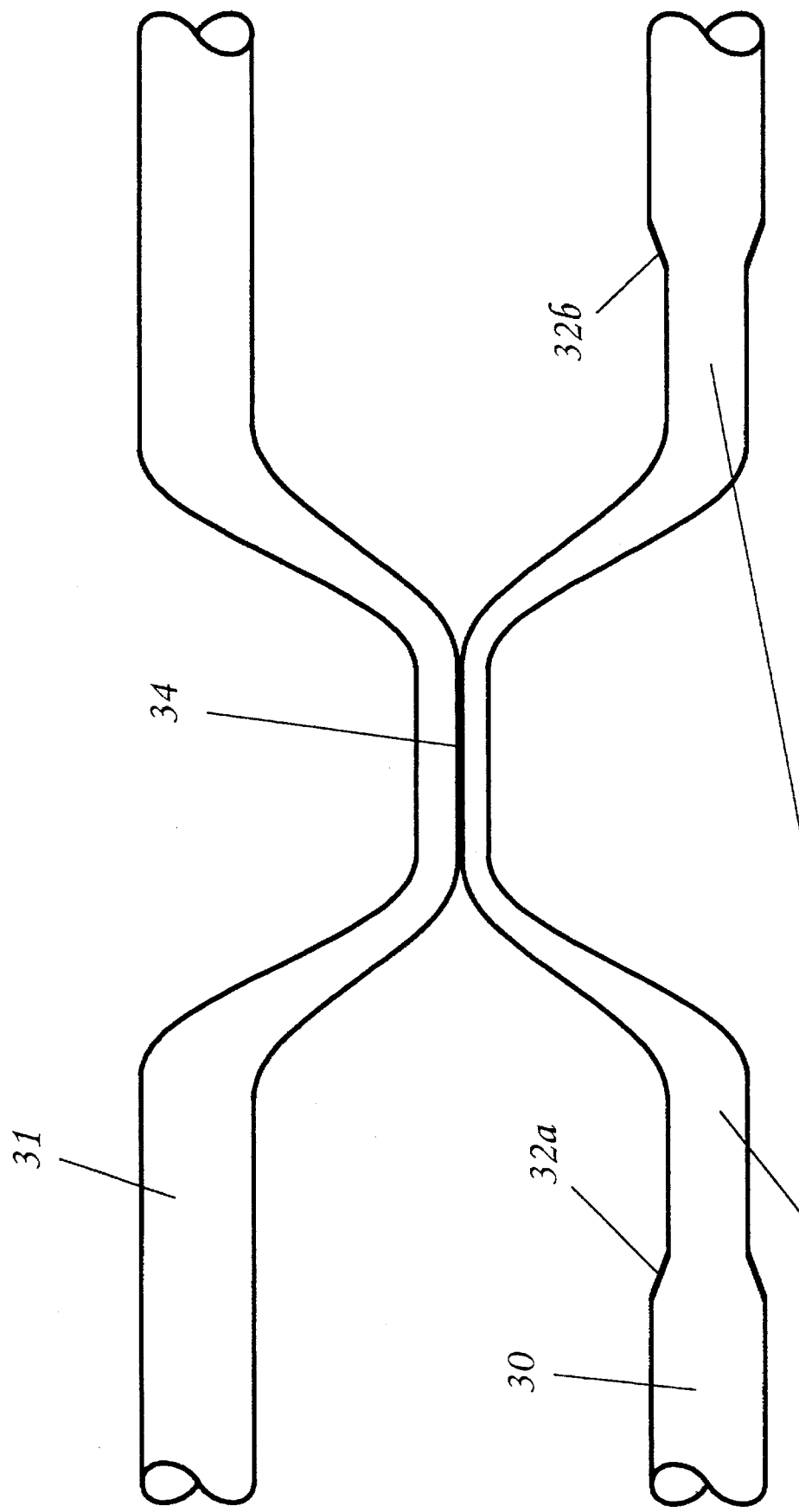
FIGS. 3 and 4 are schematic representations, on a larger scale, of optical couplers employed in the amplifiers of FIGS. 1 and 2.

The schematic representations of the couplers 10, 13, 24 and 34 of FIGS. 1 and 2 specifically distinguish the pretapered regions of these couplers from their other regions, but do not, for reasons of space on the page, specifically distinguish, from the rest of these couplers, their coupling regions that have been created by the progressive stretching method of GB-B 2 150 703. Such a coupling region of such a coupler is however specifically distinguished in the larger scale schematic representation of such a coupler in FIG. 3. The coupler of FIG. 3 is constructed from a length 30 of transmission profile type fibre and a length 31 of amplifier profile type fibre. Before the coupler is made, the transmission profile type fibre 30 is pre-stretched using the progressive stretching method of GB-B 2 150 703 in a manner producing a pair of tapers 32a, 32b between which there is an intervening length of pre-stretched fibre 33. Then, also using the progressive stretching method of GB-B 2 150 703, the two fibres are progressively stretched to produce a coupling region 34 in which the two fibres are laterally coupled.

Figure 4:
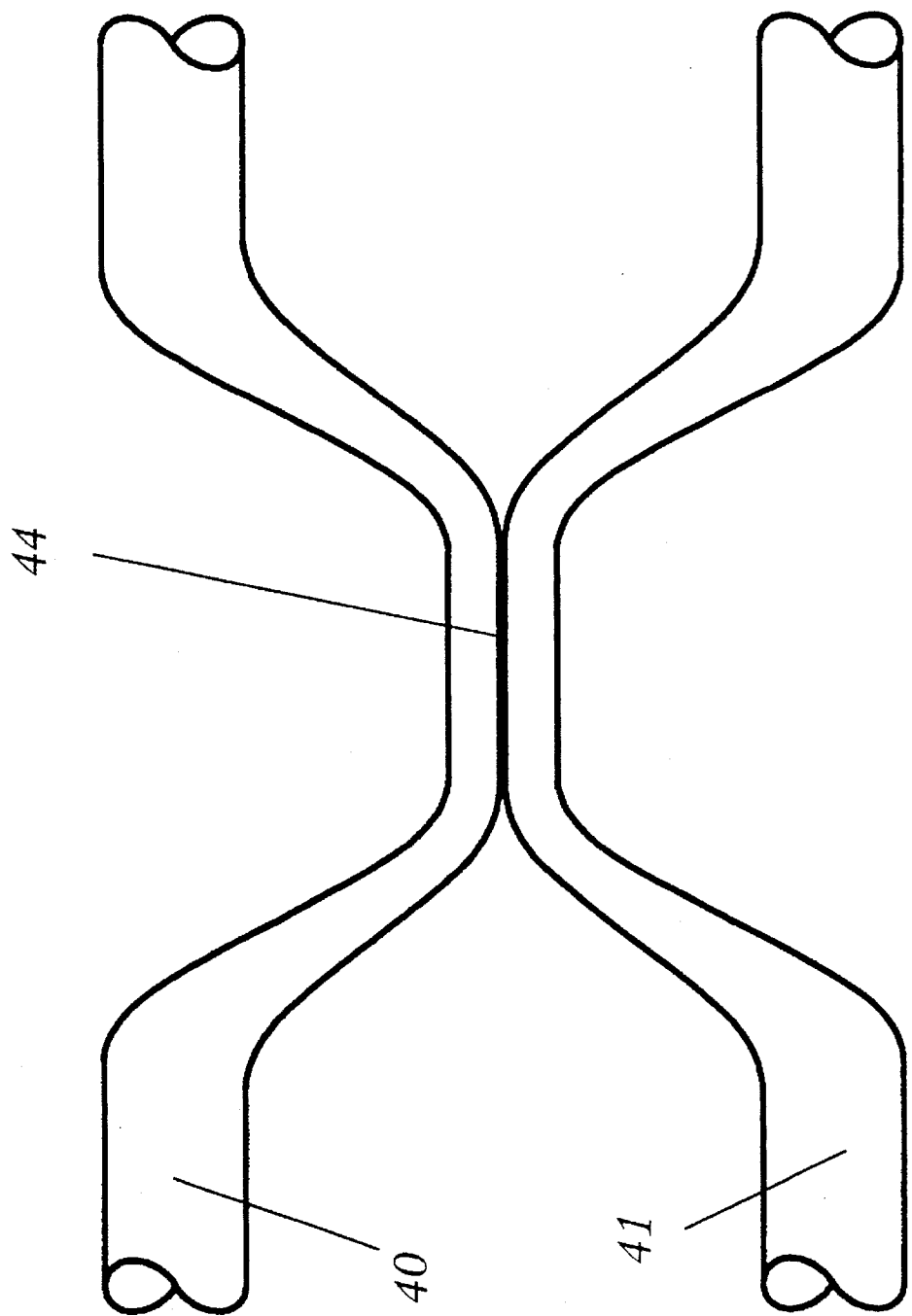

The schematic representations of the couplers 20 and 30, similarly for reasons of space on the page, do not specifically distinguish, from the rest of these couplers, their coupling regions that have been created by the progressive stretching method of GB-B 2 150 703. Such a coupling region is however distinguished in the larger scale schematic representation of such a coupler in FIG. 4. The coupler of FIG. 4 is constructed from two lengths 40, 41 of transmission profile type fibre. Using the progressive stretching method of GB-B 2 150 703, the two fibres are progressively stretched to produce a coupling region 44 in which the two fibres are laterally coupled.

We claim:

1. An optical fibre amplifier including a first length of single mode optical fibre laterally optically coupled in a first coupling region with a second length of single mode optical fibre, and in a second coupling region with a third length of single mode optical fibre, wherein said second and third lengths of optical fibre have substantially matching index profiles that are mismatched with respect to that of said first length of optical fibre, thereby providing said first length of optical fibre with a spot size mismatched with respect to that of said second and third lengths of optical fibre, and wherein included in said first length of optical fibre, between said first and said second coupling regions, is a length of optical fibre that is rendered optically amplifying to light of a first frequency when optically pumped with light of a second frequency, and wherein each of said first and second coupling regions is provided by a 2×2 tapered fused fibre coupler in which one of the two constituent fibres of that coupler is tapered more than the other by an amount providing the two constituent fibres with substantially matching propagation constants within its coupling region.

2. An optical fibre amplifier as claimed in claim 1, wherein each of said 2×2 tapered fused fibre couplers is a multiplexing coupler constructed such that a first optical input at said first frequency launched into said second length of fibre on the side of the coupler optically remote from said length of optical fibre that is rendered optically amplifying, and a second optical input at said second frequency applied to said first length of fibre on the side of the coupler optically remote from said length of optical fibre that is rendered optically amplifying, will emerge from that coupler substantially exclusively on said first length of fibre on the side of the coupler optically adjacent said length of fibre that is rendered optically amplifying.

3. An optical fibre amplifier as claimed in claim 1, wherein each of said 2×2 tapered fused fibre couplers is a multiplexing coupler constructed such that light of any state of polarisation at said first frequency launched into said second length of fibre on the side of the coupler optically remote from said length of optical fibre that is rendered optically amplifying, and light of any state of polarisation at said second frequency applied to said first length of fibre on the side of the coupler optically remote from said length of optical fibre that is rendered optically amplifying, will emerge from that coupler substantially exclusively on said first length of fibre on the side of the coupler optically adjacent said length of fibre that is rendered optically amplifying.

4. An optical fibre amplifier as claimed in claim 1, wherein each of said 2×2 tapered fused fibre couplers is a splice function type coupler constructed such that a first optical input at said first frequency launched, together with a second optical input at said second frequency, into said second length of fibre on the side of the coupler optically remote from said length of optical fibre that is rendered optically amplifying, will emerge from that coupler substantially exclusively on said first length of fibre on the side of the coupler optically adjacent said length of fibre that is rendered optically amplifying.

5. An optical fibre amplifier as claimed in claim 4, wherein optically coupled with said second length of fibre on the side of said first coupling region that is optically remote from said length of fibre that is rendered optically amplifying is a multiplexing 2×2 tapered fused fibre coupler made from two lengths of optical fibre having an index profile substantially matched with that of said second and third lengths of optical fibre and constructed to multiplex on to a common output thereof an optical signal applied of said first frequency to one of its input pods and optical pump power of said second frequency applied to the other of its input ports.

6. An optical fibre amplifier as claimed in claim 5, wherein optically coupled with said third length of fibre on the side of said second coupling region that is optically remote from said length of fibre that is rendered optically amplifying is a multiplexing 2×2 tapered fused fibre coupler made from two lengths of optical fibre having an index profile substantially matched with that of said second and third lengths of optical fibre and constructed to multiplex on to a common output thereof an optical signal applied of said first frequency to one of its input ports and optical pump power of said second frequency applied to the other of its input ports.

* * * * *